(12) United States Patent
Kim et al.

(10) Patent No.: US 7,144,301 B2
(45) Date of Patent: Dec. 5, 2006

(54) METHOD AND SYSTEM FOR PLANARIZING INTEGRATED CIRCUIT MATERIAL

(75) Inventors: Kwang-Bok Kim, Incheon Metropolitan (KR); Jae-Kwang Choi, Suwon-si (KR); Yong-Sun Ko, Suwon-si (KR); Chang-Ki Hong, Seongnam-si (KR); Kyung-Hyun Kim, Seoul (KR); Jae-Dong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/947,458

(22) Filed: Sep. 22, 2004

(65) Prior Publication Data

US 2005/0075052 A1  Apr. 7, 2005

(30) Foreign Application Priority Data

Oct. 6, 2003  (KR) ............... 10-2003-0069143

(51) Int. Cl.
*B24B 7/22* (2006.01)

(52) U.S. Cl. ........................... 451/36; 451/41
(58) Field of Classification Search ............. 451/41, 451/37, 36, 57, 5, 8, 288, 287
See application file for complete search history.

(56) References Cited

U.S. PATENT DOCUMENTS

| | | | |
|---|---|---|---|
| 5,676,587 A * | 10/1997 | Landers et al. ............... 451/57 |
| 5,851,135 A * | 12/1998 | Sandhu et al. ................. 451/5 |
| 6,203,404 B1 * | 3/2001 | Joslyn et al. .................. 451/37 |
| 6,213,852 B1 * | 4/2001 | Fujii et al. .................... 451/285 |
| 6,468,910 B1 | 10/2002 | Srinivasan et al. ......... 438/692 |
| 6,561,876 B1 * | 5/2003 | Tateyama et al. ............. 451/41 |
| 6,604,987 B1 * | 8/2003 | Sun .............................. 451/41 |

OTHER PUBLICATIONS

Korean Patent Application No. 20000027503 to Boo et al., having Application date of May 22, 2000 (w/ English Abstract page).
Japanese Patent No. JP2001009702 to Tomoyuki et al., having Publication date of May 13, 2003 (w/ English Abstract page).
Korean Patent Application No. 10-1997-0017792 to Scherber et al., having Publication date of Dec. 10, 1997 (w/ English Abstract page).
Korean Patent Application No. 10-1999-0019826 to Kim et al., having Publication date of Dec. 15, 2000 (w/ English Abstract page).

* cited by examiner

*Primary Examiner*—Robert A. Rose
(74) *Attorney, Agent, or Firm*—Monica H. Choi

(57) ABSTRACT

For planarizing an IC (integrate circuit) material, a first slurry is dispensed for a first planarization of the IC material using the first slurry, and a second slurry is dispensed for a second planarization of the IC material using the second slurry. The first and second slurries are different. For example, the first slurry is silica based for faster planarization during the first planarization. Thereafter, the second planarization is performed with the second slurry that is ceria based with higher planarity for attaining sufficient planarization of the IC material.

8 Claims, 6 Drawing Sheets

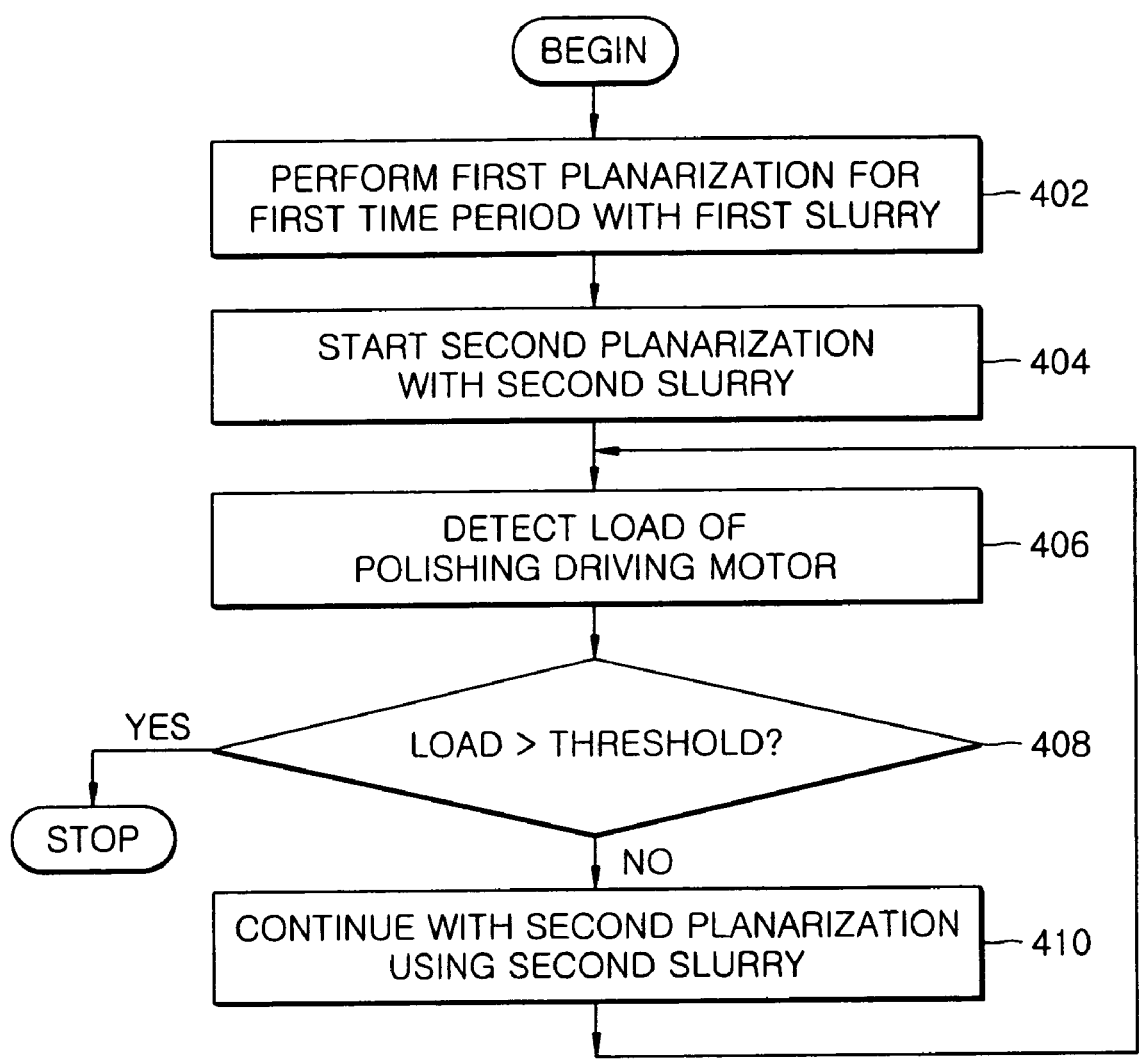

METHOD AND SYSTEM FOR PLANARIZING INTEGRATED CIRCUIT MATERIAL

BACKGROUND OF THE INVENTION

This application claims priority to Korean Patent Application No. 2003-0069143, filed on Oct. 6, 2003, in the Korean Intellectual Property Office, the disclosure of which is incorporated herein in its entirety by reference.

1. Field of the Invention

The present invention relates generally to IC (integrated circuit) fabrication, and more particularly to a method and system for planarizing IC material such as an insulating layer using a plurality of slurries.

2. Description of the Related Art

An integrated circuit (IC) is fabricated onto a semiconductor substrate such as a silicon substrate. Various materials such as insulating layers are formed onto the semiconductor substrate for fabricating the IC. The surface of the insulating layer needs to be formed into specialized patterns for fabricating the IC. Polishing is widely used to planarize the surface of the insulating layer. In particular, chemical mechanical polishing (CMP) is commonly used to planarize an insulating layer having steps formed in the upper surface thereof.

In a conventional CMP process, a polishing speed and a degree of planarization varies depending on the type and density of patterns of films that are polished. More particularly, if the heights of steps formed in the upper surface of an oxide film are greater than a predetermined height, the surface may not be sufficiently planarized when the CMP process is completed. Such incomplete planarization poses problems in subsequent fabrication processes, especially for subsequent photolithography.

To prevent such problems, a high planarity slurry, in particular, a ceria based slurry is widely used. If integrated circuit structure(s) below an oxide layer have a non-planar profile, the upper surface of the oxide layer is formed with steps. Such non-planarity is especially common within a cell array region of a memory device fabricated on the silicon substrate. In that case, the removal rate of the oxide layer during polishing is decreased because the CMP process is performed on an uneven surface of the oxide layer. Therefore, a long time is required to complete the CMP process using the high planarity slurry. Moreover, sufficient planarization of the oxide layer may not be attainable even if a high planarity slurry is used.

SUMMARY OF THE INVENTION

Accordingly, in the present invention, a plurality of planarizations are performed with a plurality of slurries for efficient planarization of an IC material such as an insulating layer.

In a method and system for planarizing an IC (integrate circuit) material, a first slurry is dispensed for a first planarization of the IC material using the first slurry, and a second slurry is dispensed for a second planarization of the IC material using the second slurry. The first and second slurries are different. In one embodiment of the present invention, the IC material is an insulating layer such as an oxide film.

In another embodiment of the present invention, the first and second planarizations are each performed with a CMP (chemical mechanical polishing) process.

In a further embodiment of the present invention, a second abrasive of the second slurry is of higher planarity than a first abrasive of the first slurry. For example, the first abrasive is silica, and the second abrasive is ceria. The second slurry is comprised of 0.1–5% by weight of ceria in an example embodiment of the present invention.

In another embodiment of the present invention, the second slurry includes a planarity selective additive. In an example embodiment of the present invention, the planarity selective additive of the second slurry is comprised of 0.1–2.5% (such as 1.5% for example) by weight of anionic surfactant.

With such a planarity selective additive, a load of a polishing driver motor indicates whether the IC material is sufficiently polished. Thus, the second planarization is automatically stopped when a load of a polishing driving motor is greater than a threshold.

In this manner, by performing the first planarization of the IC material using the first slurry of lower planarity, the IC material is partially polished at a faster rate. Thereafter, the second planarization is performed with the second slurry of higher planarity for attaining sufficient planarization of the IC material.

BRIEF DESCRIPTION OF THE DRAWINGS

The above and other features and advantages of the present invention will become more apparent when described as detailed embodiments with reference to the attached drawings in which:

FIG. 11 shows a flow-chart of steps for a method of polishing an IC material using multiple slurries, according to an embodiment of the present invention.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION OF THE INVENTION

Figure 1:
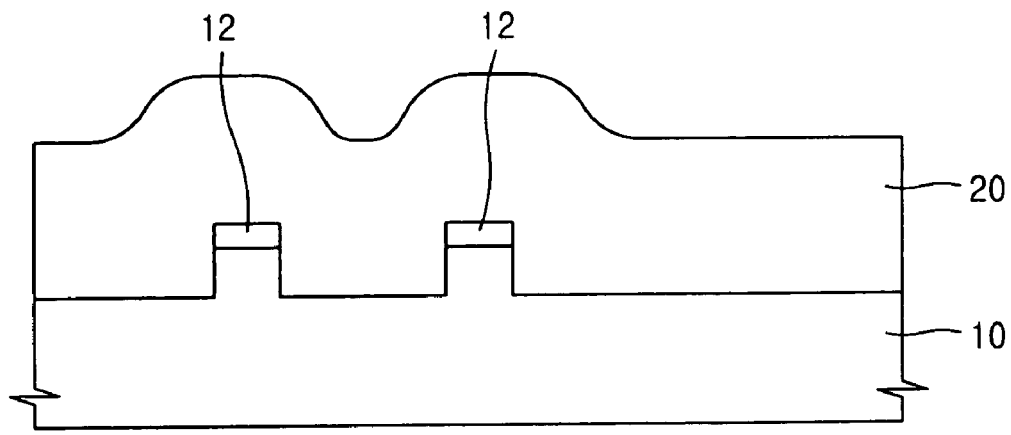
FIGS. 1, 2, and 3 show cross-sectional views illustrating a process of polishing an IC (integrated circuit) material, according to an embodiment of the present invention.
Figure 2:
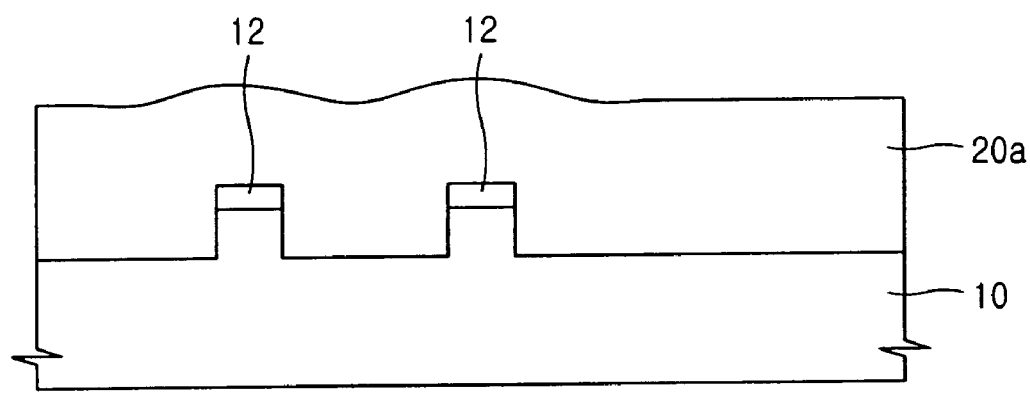
Figure 3:
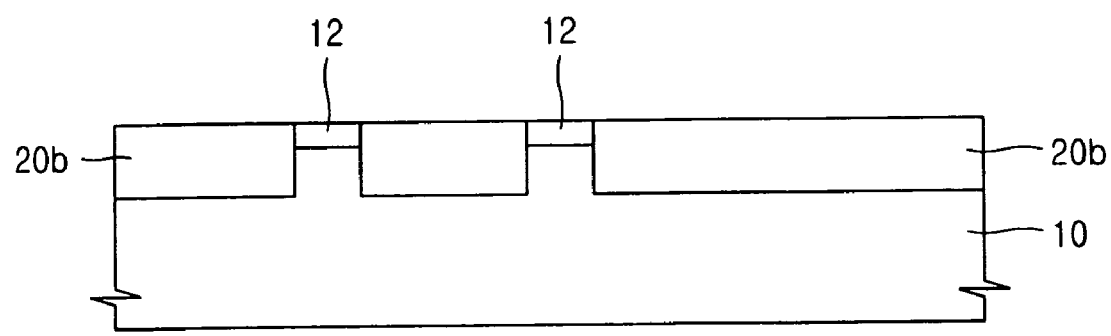
Figure 9:
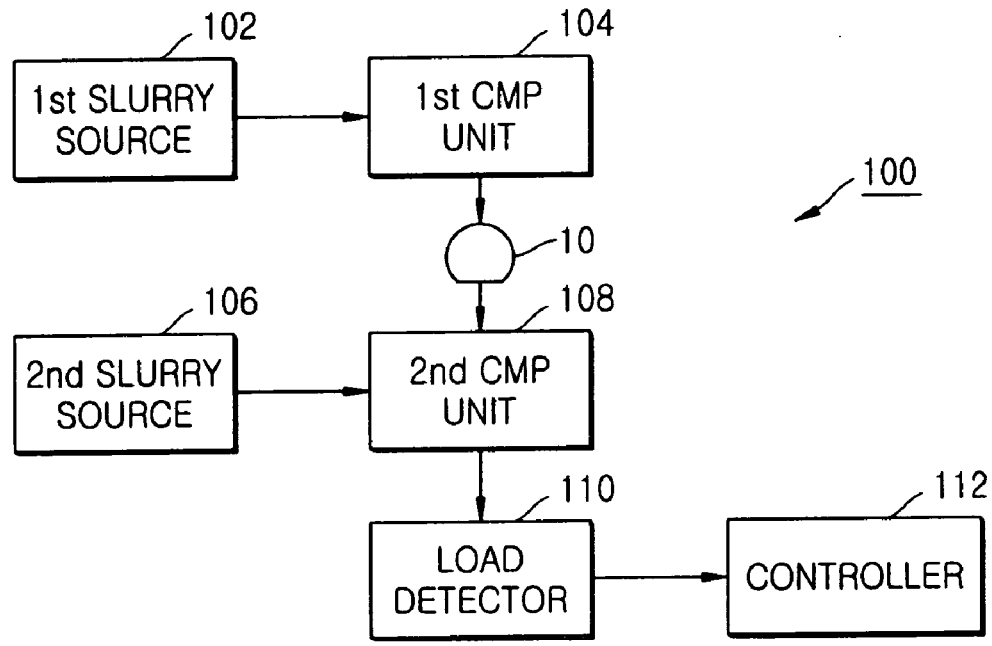
FIGS. 9 and 10 each show a block diagram of a system for polishing an IC material using multiple slurries, according to an embodiment of the present invention.
Figure 10:
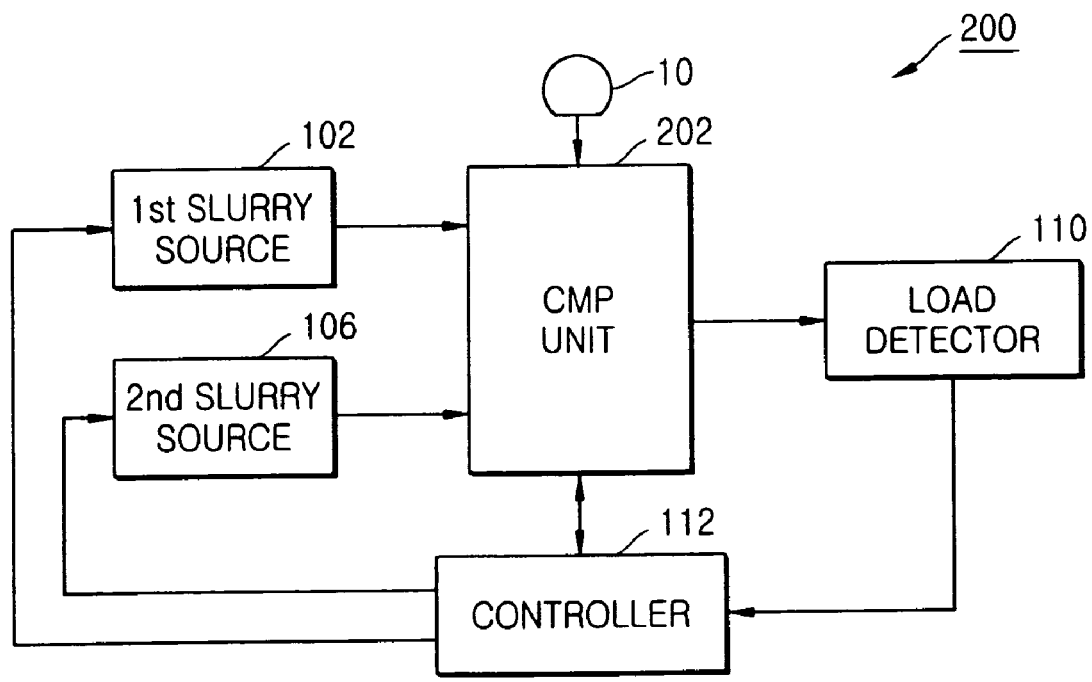

FIGS. 1, 2, and 3 show cross sectional views while FIG. 11 shows a flow-chart of steps for polishing an IC material using multiple slurries according to an embodiment of the present invention. FIG. 9 shows a first system 100 for polishing the IC material using multiple slurries according to a first embodiment of the present invention. FIG. 10 shows a second system 200 for polishing the IC material using multiple slurries according to a second embodiment of the present invention.

The system 100 of FIG. 9 includes a first slurry source 102 coupled to a first CMP (chemical mechanical polishing) unit 104 and a second slurry source 106 coupled to a second CMP (chemical mechanical polishing) unit 108. In addition, a load detector 110 is coupled to a polishing motor driver (not shown in FIG. 9) of the second CMP unit 108. The load detector 110 is coupled to a controller 112 that controls operation of the second CMP unit 108.

The system 200 of FIG. 10 is similar to the system 100 of FIG. 1 with elements having the same reference number having similar structure and/or function. However, the first slurry source 102, the second slurry source 106, and the load detector 110 in FIG. 10 are coupled to a main CMP (chemical mechanical polishing) unit 202. Furthermore, the controller 112 controls operation of the first slurry source 102, the second slurry source 106, and the main CMP unit 202.

The method and system for polishing an IC material using multiple slurries is now described in reference to FIGS. 1, 2, 3, 9, 10, and 11. Referring to FIG. 1, a semiconductor substrate 10 has an integrated circuit (IC) fabricated thereon. Such an IC includes an IC material 20 which is comprised of an oxide film in an example embodiment of the present invention.

The IC further includes other IC structures such as trenches, gate electrodes, capacitors, etc. formed under the oxide film 20 including nitride pads 12 that act as an etch stop. The oxide film 20 has steps formed in its upper surface due to non-planarity of the IC structures under the oxide film 20.

Referring to FIGS. 2 and 11, a first planarization with a first slurry is performed (step 402 of FIG. 11) to partially polish the oxide film 20. Referring to the system 100 of FIG. 9, the first slurry source 102 dispenses the first slurry within the first CMP unit 104 for performing the first planarization on the oxide film 20 using the first slurry. Referring to the system 200 of FIG. 10, the first slurry source 102 dispenses the first slurry within the main CMP unit 202 for performing the first planarization on the oxide film 20 using the first slurry.

In either case, a partly polished oxide film 20a of FIG. 2 results after the first planarization using the first slurry. The first slurry is a silica based slurry in one embodiment of the present invention. The silica acts as an abrasive in the first slurry that polishes the oxide film 20 relatively fast without a delay at an initial stage as will be described further herein.

The silica based slurry is not more selective to the oxide film over a nitride layer than a ceria based slurry, but the silica based slurry reduces the time required for polishing because the CMP process performed to polish the oxide film 20 is not delayed at an initial stage as will be described further herein.

Referring to FIGS. 3 and 11, a second planarization with a second slurry is started (step 404 of FIG. 11) to completely polish the oxide film 20a. Referring to the system 100 of FIG. 9, the semiconductor substrate 10 having the oxide film 20a thereon is moved from the first CMP unit 104 to the second CMP unit 108. Thereafter, the second slurry source 106 dispenses the second slurry within the second CMP unit 108 for performing the second planarization on the oxide film 20a using the second slurry.

Referring to the system 200 of FIG. 10, the semiconductor substrate 10 having the oxide film 20a thereon remains within the main CMP unit 202. Thereafter, the controller 112 controls the second slurry source 102 to dispense the second slurry within the main CMP unit 202 for performing the second planarization on the oxide film 20a using the second slurry. The first slurry source 102 no longer dispenses the first slurry during the second planarization using the second slurry in one embodiment of the present invention.

In one embodiment of the present invention, when silica is the abrasive of the first slurry, ceria is the abrasive of the second slurry. Thus, the second slurry is different from and is a higher planarity slurry than the first slurry.

With such a ceria-based higher planarity slurry, the resulting oxide film 20b of FIG. 3 after the second planarization is sufficiently planarized. In addition, with such a ceria-based higher planarity slurry, variation in the amount of the etch stop 12 removed by the second planarization is minimized when the etch stop 12 is comprised of nitride, due to a high selectivity of polishing for the oxide film 20b over the nitride 12. The second slurry is comprised of 0.1–5% by weight of ceria in an embodiment of the present invention.

Additionally, the second slurry includes a planarity selective additive (PSA) such as an anionic surfactant such that the CMP process may be automatically stopped when the second planarization of the oxide film 20 is completed. In one embodiment of the present invention, the second slurry includes 0.1–2.5% by weight of the anionic surfactant.

By adjusting the concentration of the anionic surfactant, a self-stopping function of a CMP unit is particularly suitable during the second planarization using the second slurry according to an aspect of the present invention. For such a self-stopping function, the load detector 110 of FIGS. 10 and 11 measures a load of a polishing driving motor such as a driving mortar of a turn table or a top ring of the CMP unit 108 or 202 (step 406 of FIG. 11).

The controller 112 of FIG. 10 or 11 compares the measured load of the polishing driving motor to a threshold (step 408 of FIG. 11). If the measured load of the polishing driving motor is greater than the threshold, the controller 112 stops the second planarization using the second slurry. Otherwise, the second planarization using the second slurry is continued (step 410 of FIG. 11) with periodic checking of the load of the polishing motor (return to step 406 of FIG. 11). The load detector 110 and the controller 112 may be components disposed within the second CMP unit 108 or the main CMP unit 202 for performing the second planarization using the second slurry.

Applicants determined that the relationship between an amount of the oxide film removed by the CMP process using the second slurry and the load of the driving motor is non-linear with an optimal concentration of the anionic surfactant in the second slurry. In one embodiment of the present invention, such an optimal concentration is 1.5% by weight of the anionic surfactant for the self-stopping function of the CMP unit 108 or 202, as will be further described herein.

Figure 4:
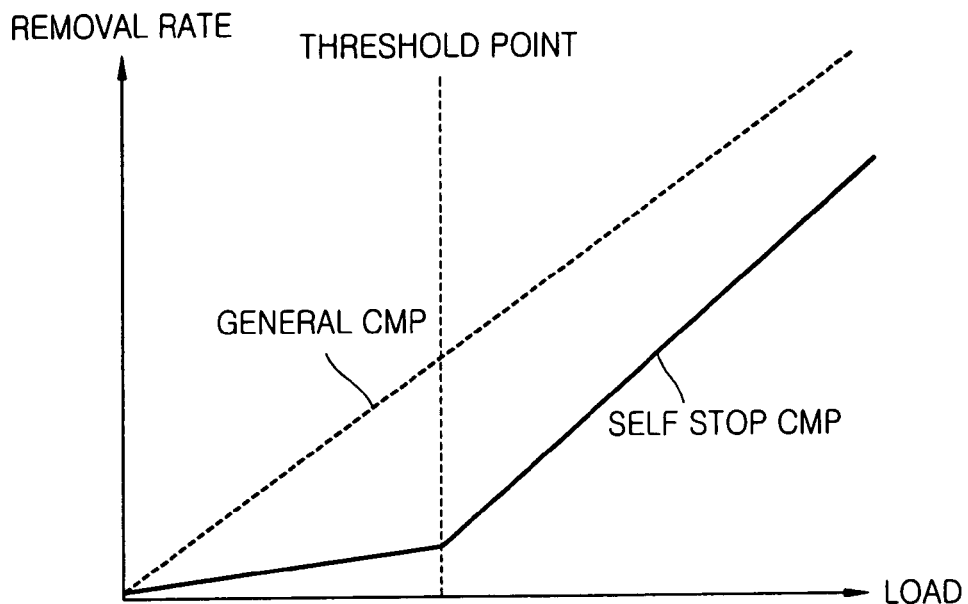
FIG. 4 shows a graph of removal rate of an oxide film with respect to a load of a driving motor, in a general CMP process and in a CMP process according to the present invention.

FIG. 4 is a graph of a removal rate of the oxide film 20a versus a load of the driving motor for a general CMP process without a self-stopping function, and for a self-stop CMP process with the self-stopping function according to an embodiment of the present invention. Referring to FIG. 4, in the general CMP process, the removal rate of the oxide film is linear with the load of the driving motor. In contrast, for the self-stop CMP process according to the present invention, the removal rate of the oxide film is non-linear with respect to the load of the driving motor. Thus, a threshold point, which is an inflection point of the graph, is apparent for the self-stop CMP process according to the present invention.

Figure 5:
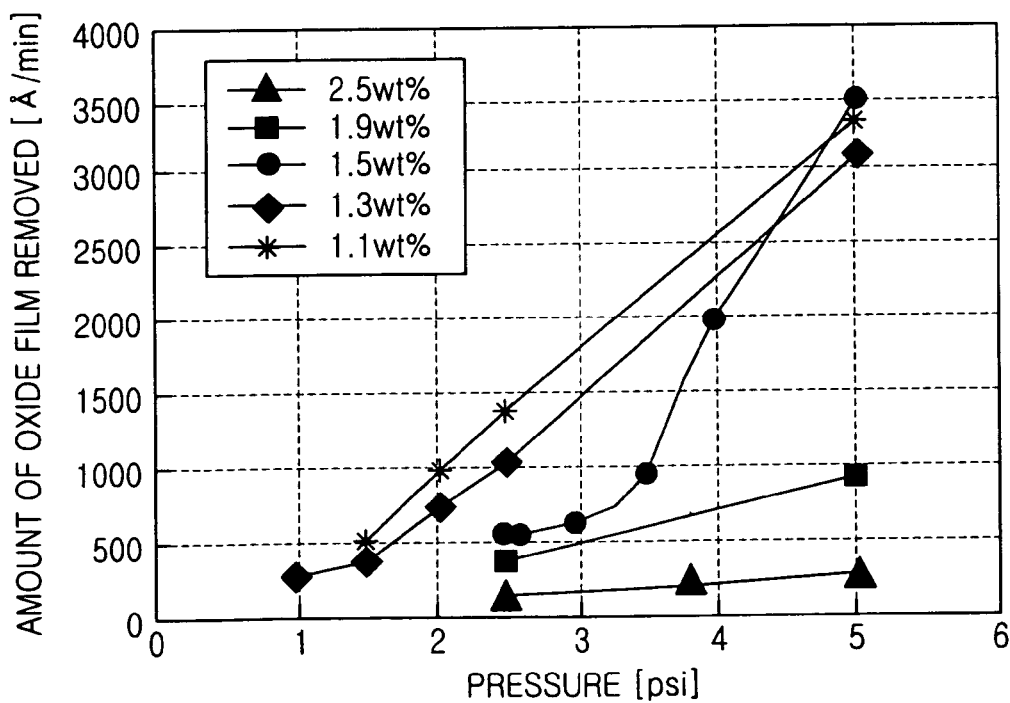
FIG. 5 shows graphs of amount of the oxide film removed with respect to pressure using ceria based high planarity slurries with different concentrations of an anionic surfactant.

FIG. 5 shows graphs of amount of the oxide film removed versus pressure within a CMP unit using ceria based slurries with different concentrations of an anionic surfactant. Referring to FIG. 5, each graph is for an oxide film having non-planar steps polished by a CMP process using a ceria based high planarity slurry in which the concentration of an anionic surfactant is 1.1, 1.3, 1.5, 1.9, or 2.5% by weight. The ceria based high planarity slurry includes ceria as an abrasive with a concentration of 0.5% by weight.

Further referring to FIG. 5, the graph is non-linear when the concentration of the anionic surfactant in the ceria based high planarity slurry (i.e., the second slurry) is 1.5% by weight. Thus, FIG. 5 confirms that the optimal concentration of the anionic surfactant for the second slurry is 1.5% by weight, such that the second planarization may be automatically stopped by determining when the measured load (i.e., pressure) of the polishing motor reaches the threshold.

Figure 6:
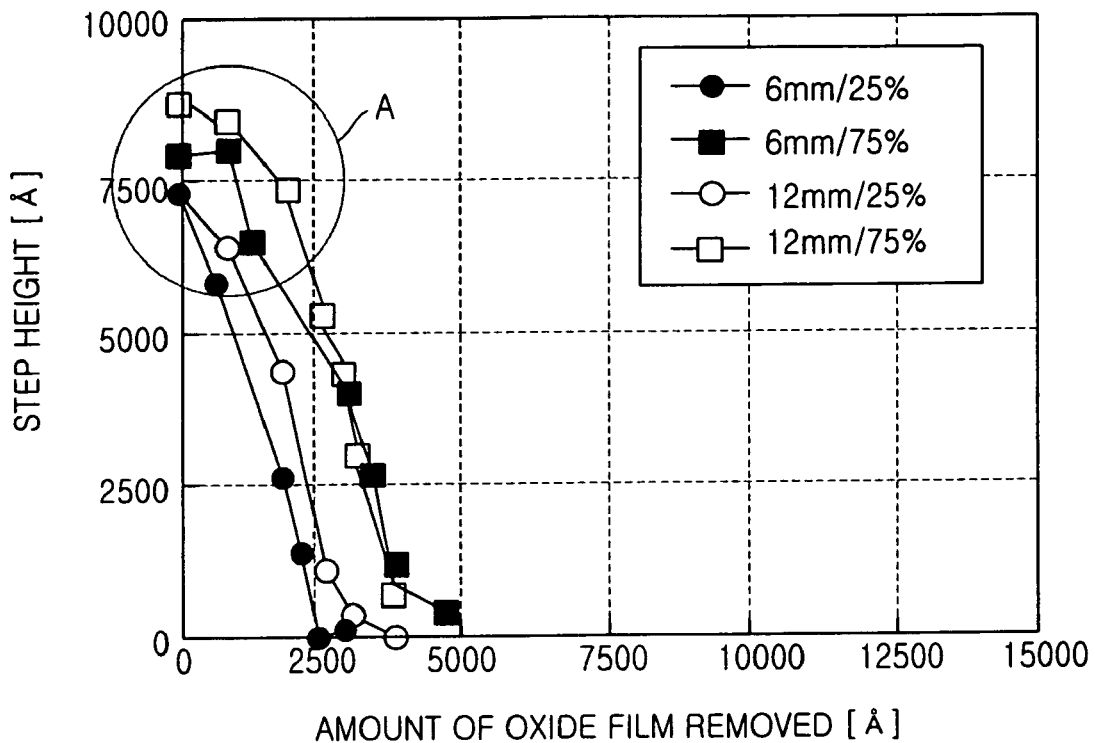
FIG. 6 shows graphs of height of steps formed in an upper surface of an oxide film with respect to an amount of the oxide film removed for a CMP process using a ceria based high planarity slurry.

FIG. 6 shows graphs of height of steps in an upper surface of an oxide film with respect to an amount of the oxide film removed in the CMP process using a ceria based high planarity slurry. For such graphs of FIG. 6, the oxide film has initial steps with a height of 8000 Å formed in a chip unit. In addition, FIG. 6 illustrates graphs for cases when a ratio of the upper surfaces of the steps to the whole area of the semiconductor is 25% or 75% and cases when the distance between the chip units is 6 mm or 12 mm.

Referring to FIG. 6, as the oxide film is initially removed (in the region labelled A in FIG. 6), the height of the steps does not initially decrease at a high rate indicating a delay phenomenon. With such a delay phenomenon, the CMP process using the ceria based high planarity slurry requires more time to complete the CMP process.

Figure 7:
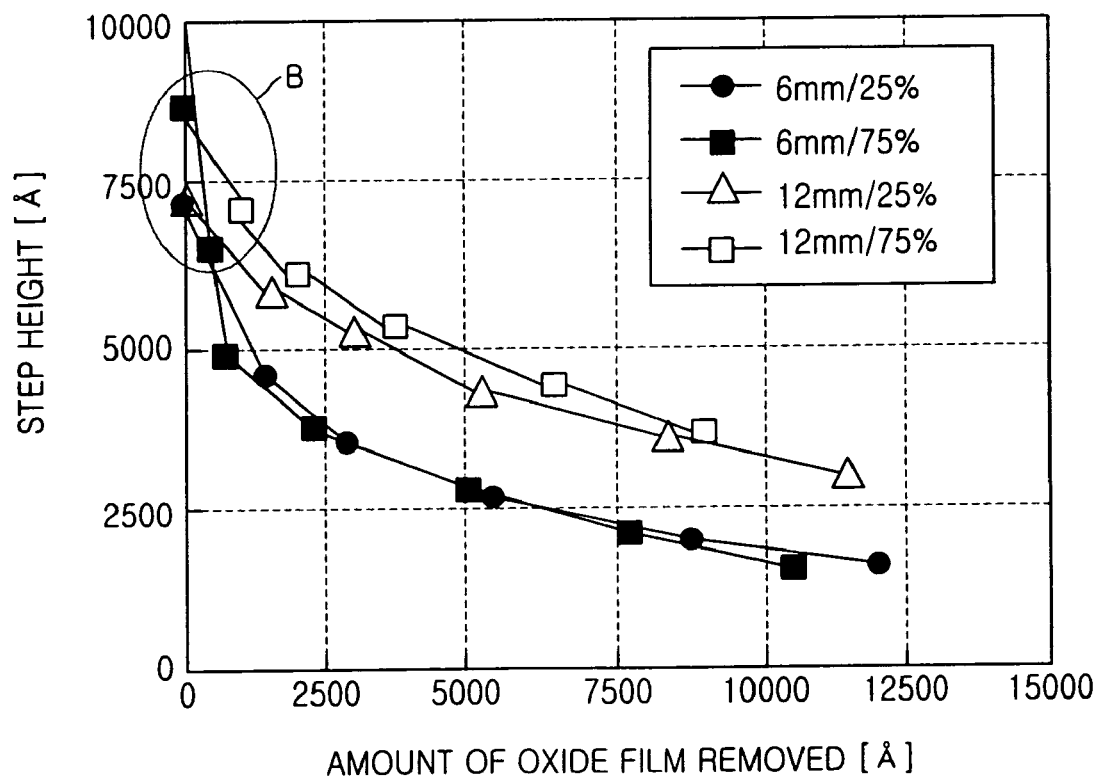
FIG. 7 shows graphs of height of steps formed in an upper surface of an oxide film with respect to an amount of the oxide film removed for a CMP process using a silica based slurry.

FIG. 7 shows graphs similar to that of FIG. 6 except with the difference of using a silica based slurry instead of a ceria based high planarity slurry. As indicated in the region B of FIG. 7, the height of steps of the oxide film drops at a higher rate as the oxide film is initially polished such that a delay phenomenon does not occur with the silica based slurry.

Figure 8:
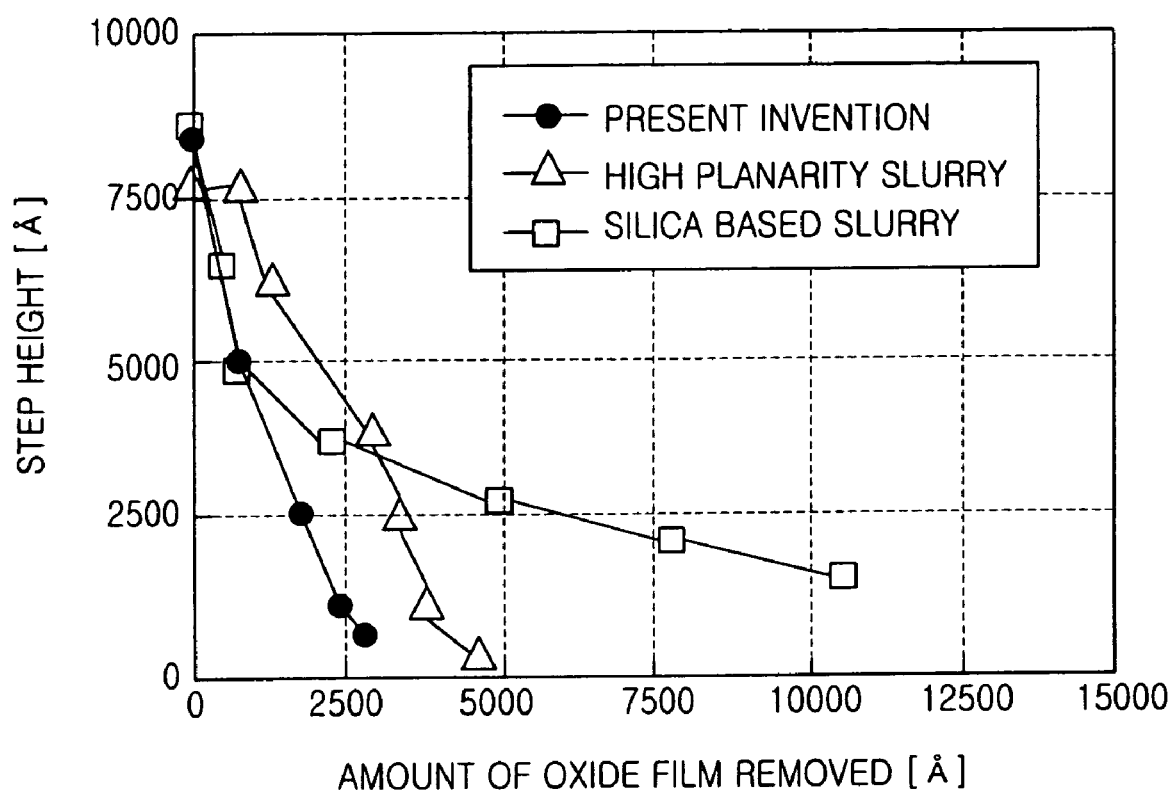
FIG. 8 shows a graph of a height of steps formed in an upper surface of an oxide film with respect to an amount of the oxide film removed for planarization using multiple slurries according to an embodiment of the present invention.

Thus, according to the present invention, the first planarization using the first slurry that is silica based is initially performed to avoid the delay phenomenon for more efficient planarization. FIG. 8 shows graphs of height of steps formed in an upper surface of an oxide film with respect to an amount of the oxide film removed when the first slurry that is silica based is used to polish the oxide film at the initial stage of the CMP process and then a ceria based high planarity slurry is subsequently used to complete the CMP process. FIG. 8 also shows graphs for the case when only a ceria based high planarity slurry is used in the CMP process and the case when only a silica based slurry is used in the CMP process.

Referring to FIG. 8, the graph according to the present invention follows the more dramatic decrease in the height of steps for the silica based slurry polish at an initial stage. Thereafter, the graph according to the present invention follows the steeper decrease in the height of steps for the ceria based high planarity slurry for completion of the CMP process.

In this manner, by performing the first planarization of the oxide film 20 using the first slurry that is silica based, the oxide film is partially polished at a faster rate. Thereafter, the second planarization is performed for the oxide film 20a with the second slurry that is ceria based for higher planarity of the completely planarized oxide film 20b. In addition, a planarity selective additive (PSA) such as an anionic surfactant is added to the second slurry with optimal concentration such that the second planarization is self-stopping.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, embodiments of the present invention have been described for planarizing an oxide film. However, the present invention may be applied to planarizing any type of insulating layer or any type of integrated circuit material.

What is claimed is:

1. A method of planarizing an integrated circuit material, comprising:
dispensing a first slurry for performing a first planarization of the integrated circuit material in a first chemical mechanical polishing process using the first slurry;
dispensing a second slurry for performing a second planarization of the integrated circuit material in a second chemical mechanical polishing process using the second slurry,
wherein the first slurry is comprised of a first abrasive material that is different from a second abrasive material comprising the second slurry;
determining a concentration of a planarity selective additive in the second slurry that results in an inflection point in a non-linear plot of removal rate of the integrated circuit material versus a load of a polishing driving motor used in the second chemical mechanical polishing process;
wherein the second slurry includes the planarity selective additive with the concentration resulting in the non-linear plot; and
stopping the second planarization when the load of the polishing driving motor is greater than a threshold point being said inflection point.

2. The method of claim 1, wherein the integrated circuit material is an insulating layer.

3. The method of claim 2, wherein the integrated circuit material is an oxide film.

4. The method of claim 1, wherein the first abrasive material polishes the integrated circuit material at a faster rate than the second abrasive material toward a beginning of polishing the integrated circuit material.

5. The method of claim 4, wherein the first abrasive material is silica and wherein the second abrasive material is ceria.

6. The method of claim 5, wherein the second slurry is comprised of 0.1–5% by weight of ceria.

7. The method of claim 1, wherein the planarity selective additive comprises an anionic surfactant.

8. The method of claim 1, wherein the integrated circuit material is formed as part of an integrated circuit on a semiconductor substrate.

* * * * *